US007549079B2

(12) United States Patent
Connolly et al.

(10) Patent No.: US 7,549,079 B2
(45) Date of Patent: Jun. 16, 2009

(54) SYSTEM AND METHOD OF CONFIGURING A DATABASE SYSTEM WITH REPLICATED DATA AND AUTOMATIC FAILOVER AND RECOVERY

(75) Inventors: Sean Connolly, Nashua, NH (US); Gary Allison, Nashua, NH (US); Jiangbin Luo, Nashua, NH (US); Nitin Yashwant Karkhanis, Nashua, NH (US); Stephen John Vivian, Londonderry, NH (US); Michael Seward Harvey, Hollis, NH (US)

(73) Assignee: Oracle International Corporation, Redwood Shores, CA (US)

( * ) Notice: Subject to any disclaimer, the term of this patent is extended or adjusted under 35 U.S.C. 154(b) by 500 days.

(21) Appl. No.: 11/289,974

(22) Filed: Nov. 30, 2005

(65) Prior Publication Data

US 2007/0168704 A1 Jul. 19, 2007

(51) Int. Cl.
  *G06F 11/00* (2006.01)
(52) U.S. Cl. .................... 714/5; 714/4; 714/46; 714/57
(58) Field of Classification Search .................. 714/46, 714/57
  See application file for complete search history.

(56) References Cited

U.S. PATENT DOCUMENTS

| 6,625,747 B1 * | 9/2003 | Tawil et al. ........................ 714/6 |
| 6,636,239 B1 * | 10/2003 | Arquie et al. ................ 715/736 |
| 6,802,021 B1 * | 10/2004 | Cheng et al. ..................... 714/4 |
| 7,027,053 B2 * | 4/2006 | Berndt et al. ................ 345/473 |
| 7,058,853 B1 * | 6/2006 | Kavanappillil et al. ......... 714/13 |
| 7,069,465 B2 * | 6/2006 | Chu et al. ........................ 714/6 |
| 7,167,999 B2 * | 1/2007 | Cheng et al. ..................... 714/4 |
| 7,203,796 B1 * | 4/2007 | Muppalaneni et al. ....... 711/114 |
| 7,225,356 B2 * | 5/2007 | Monitzer ...................... 714/12 |
| 7,290,017 B1 * | 10/2007 | Wang et al. ................. 707/204 |
| 2002/0143888 A1 * | 10/2002 | Lisiecki et al. ............... 709/214 |
| 2004/0010502 A1 * | 1/2004 | Bomfim et al. ............. 707/100 |
| 2004/0073677 A1 * | 4/2004 | Honma et al. ............... 709/226 |
| 2004/0153717 A1 * | 8/2004 | Duncan ......................... 714/5 |
| 2005/0193132 A1 * | 9/2005 | O'Brien et al. ............. 709/229 |

(Continued)

OTHER PUBLICATIONS

Database Mirroring in SQL Server 2005, published Apr. 1, 2005 by Ron Talmage, Solid Learning, pp. 54 http://www.microsoft.com/technet/prodtechnol/sql/2005/dbmirror.mspx.

(Continued)

*Primary Examiner*—Robert Beausoliel
*Assistant Examiner*—Charles Ehne
(74) *Attorney, Agent, or Firm*—Gordon E. Nelson

(57) ABSTRACT

A graphical user interface based method of configuring automatic failover from a primary database system to a standby database system that is coupled to the primary database system by a network. Also coupled to the network is an observer process that is independent of the database systems and that initiates the failover process. The observer periodically pings the database systems to determine whether a failover is necessary. The graphical user interface permits a user to specify the primary and secondary database systems, configure the observer, and specify conditions under which a failover may occur and to enable automatic failover. A failover context is created from the inputs to the GUI and stored in persistent storage belonging to the database systems. If the Observer's context is stale, the Observer fetches the database system's context.

37 Claims, 9 Drawing Sheets

U.S. PATENT DOCUMENTS

| | | | |
|---|---|---|---|
| 2005/0268145 A1* | 12/2005 | Hufferd et al. | 714/2 |
| 2005/0273645 A1* | 12/2005 | Satran et al. | 714/4 |
| 2006/0080568 A1* | 4/2006 | Subbaraman et al. | 714/4 |
| 2006/0085668 A1* | 4/2006 | Garrett | 714/4 |
| 2006/0089935 A1* | 4/2006 | Clifford et al. | 707/10 |
| 2006/0090097 A1* | 4/2006 | Ngan et al. | 714/6 |
| 2006/0123098 A1* | 6/2006 | Asher et al. | 709/218 |
| 2006/0149797 A1* | 7/2006 | Chai et al. | 707/204 |
| 2006/0179147 A1* | 8/2006 | Tran et al. | 709/227 |
| 2006/0259811 A1* | 11/2006 | Novick | 714/5 |
| 2006/0277384 A1* | 12/2006 | Yagawa et al. | 711/170 |
| 2007/0055765 A1* | 3/2007 | Lisiecki et al. | 709/223 |
| 2007/0078982 A1* | 4/2007 | Aidun et al. | 709/225 |
| 2007/0168693 A1* | 7/2007 | Pittman | 714/4 |

OTHER PUBLICATIONS

Excerpt from help file 2003 on products listed by Microsoft 2003, pp. 56 http://www.yukon/adm_dbmoverview_6tpt.htm.

* cited by examiner

SYSTEM AND METHOD OF CONFIGURING A DATABASE SYSTEM WITH REPLICATED DATA AND AUTOMATIC FAILOVER AND RECOVERY

CROSS-REFERENCE TO RELATED APPLICATIONS

The present patent application is closely related to and is being filed on even date with U.S. Ser. No. 60/741,141, George H. Claborn, et at., AUTOMATIC FAILOVER TO A STANDBY DATABASE WITH NO DATA LOSS, assigned to the assignee of the present patent application. U.S. Ser. No. 60/741,141 is incoporated by reference herein for all purposes.

STATEMENT REGARDING FEDERALLY SPONSORED RESEARCH OR DEVELOPMENT

Not applicable.

REFERENCE TO A SEQUENCE LISTING

Not applicable.

BACKGROUND OF THE INVENTION

1. Field of the Invention

The present invention relates generally to database management systems and more particularly to a method of configuring a database management system for automatic failover from a primary database server to a standby database server and subsequent recovery of the failed primary database server.

2. Description of Related Art

As government and business store increasing amounts of data in database systems, there are increasing demands to have such data always available, even in the face of catastrophic failure of computer hardware, network outage, disastrous data corruption, etc. To meet these requirements database system engineers have developed a number of features to have database data replicated in a number of different computer systems. Once data is replicated from one database system to another, if the first database system fails or otherwise becomes unavailable, the second database is used for processing database requests. The process of switching from an unavailable first database system to a second database system is commonly known as failover. Replication features such as those just described are available under the name Oracle Data Guard in relational database systems manufactured by Oracle Corporation of Redwood City, Calif.

FIG. 1 shows a database system that uses Data Guard to replicate data to multiple standby databases across a network. Replicated database system 101 contains primary database 103 and two standby databases 113 and 121. Primary database 103 contains database information including database tables and meta-data. Updates made to the primary database 103 are transmitted via network 105 to replication system 108, which replicates the updates in database 113 and/or to replication system 110, which replicates the updates in database 121. In both replication systems, what is transmitted via network 105 is updates in the form of redo-data 107. The redo-data is then stored in archived redo log files 109. Redo log files 109 are files that contain redo-data records. Redo-data records record data that the database system can use to reconstruct all changes made to the primary database 103, including changes that have not yet been committed (made permanent). For example, if a balance value in a bank_balance table changes, the database system generates a redo-data record containing a change vector that describes the change to the database. When the redo-data is used to recover the database system, the database system reads the change vectors in the redo-data records and applies the changes recorded in the vectors to the database.

In replication system 108, redo log files 109($i$) are applied at 111 against physical standby database 113. Physical standby database 113 provides a physically identical copy of primary database 103, with on-disk database structures that are identical to the primary database 103 on a block-for-block basis. The database schema, including indexes therein, is the same. A physical standby database 113 is said to be synchronized with the primary database when all of the redo data produced by the primary database has been received in replication system 108.

In replication system 110, redo log files 109($ii$) are applied against logical standby database 121. Logical standby database 121 contains the same logical information as the primary database 103, although the physical organization and structure of the data can be different.

An Oracle database system 101 using Data Guard can be run in three distinct protection modes:

Maximum protection

This mode offers the highest level of data protection. Redo-data 107 is synchronously transmitted (SYNC) to standby database system 108 or 110 from the primary database 103, and transactions are not committed on primary database 103 unless redo-data 107 is available to at least one standby database 113 or 121 configured in this mode. If the last standby database system configured in this mode becomes unavailable, processing stops on primary database 103. This mode guarantees no data loss because the primary database 103 and standby database 113 or 121 are, and remain, synchronized with each other with respect to the redo-data that is available to each.

Maximum availability

This mode is similar to the maximum protection mode, including the guarantee of no data loss at least so long as primary database 103 and standby database 113 or 121 remain synchronized with each other with respect to the redo-data that is available to each. However, if standby database system 108 or 110 becomes unavailable (for example, due to network connectivity problems), processing continues on primary database 103. Thus the primary and that standby are no longer synchronized with each other—the primary has generated redo-data that is not yet available to the standby. When the fault is corrected, standby database 113 or 121 is resynchronized with primary database 103. If there is a need to failover before the standby database is resynchronized, some data may be lost.

Maximum performance

This mode offers slightly less data protection to primary database 103, but higher potential performance for the primary than does maximum availability mode. In this mode, as primary database 103 processes transactions, redo-data 107 is asynchronously transmitted (ASYNC) to standby database system 108 or 110. The commit operation on primary database 103 does not wait for standby database system 108 or 110 to acknowledge receipt of redo-data 107 before completing write operations on primary database 103. If any standby destination 113 or 121 becomes unavailable, processing continues unabated on primary database 103. There is little impact on primary database 103 performance due either to the overhead of asynchronously transmitting redo-data or to the loss of the standby.

In Oracle Data Guard, automatic failover is termed Fast-start Failover or FSFO. Configuring a replicated database system 101 for Fast-Start Failover requires that the database administrator perform a series of discrete steps:

1. Upgrade the protection mode of the database configuration to be maximum availability;
2. Configure flash recovery areas for all databases in the configuration;
3. Enable flashback logging on all databases in the configuration;
4. Create standby redo log files for all databases in the configuration;
5. Change the log transport mode of the failover target standby database to be synchronous (SYNC);
6. Restart the primary, the standby, or both databases;
7. Enable Fast-Start Failover in the Data Guard configuration;
8. Configure the Oracle Net for database communications;
9. Set the Fast-Start Failover Threshold value;
10. Start the Fast-Start Failover observer process.

The steps to configure a database configuration for automatic failover are error prone, require a large amount of time, and require manipulation of the databases by hand using SQL*Plus or other programmatic interfaces. What is needed is an easy technique for configuring a database system with replicated data in a plurality of standby databases for automatic failover. It is an object of the invention to provide such a technique.

BRIEF SUMMARY OF THE INVENTION

The object of the invention is attained by a novel technique for configuring automatic failover from a primary database system to a standby database system. The database systems are coupled together by a network. The technique is characterized by the use of a graphical user interface server that is coupled to the network to provide a graphical user interface to a graphical user interface client that is coupled to the network. A user inputs automatic failover configuration information to the graphical user interface client. The graphical user interface server receives the automatic failover configuration information from the graphical user interface client and stores the automatic failover configuration information in persistent storage accessible via the network. An observer that is coupled to the network and that executes independently of the primary database system and the standby database system obtains the automatic failover configuration information from the persistent storage. The observer initiates the automatic failover in accordance with the automatic failover configuration information.

Other aspects of the technique include:
  using automatic failover status information available to the graphical user interface server in the graphical user interface;
  when the automatic failover configuration information so indicates, enabling the observer to initiate automatic failover; and
  the observer detects whether an automatic failover is required by pinging the primary database system and receiving an indication in response thereto that the automatic failover is required.

The automatic failover configuration information may include a designator for the primary database system, a designator for the secondary database system, a location for the observer, a threshold time that determines a minimum period of time for which the observer must be out of contact with the primary database system before the observer initiates the automatic failover, and a restart indication that indicates whether the observer should be restarted when automatic failover status information so indicates.

In still further aspects of the technique, the observer periodically determines whether the automatic failover configuration information in the persistent storage has changed, and when the observer so determines, the observer obtains the changed automatic failover configuration information. In one version of the invention, the persistent storage belongs to the primary database system.

Other objects and advantages will be apparent to those skilled in the arts to which the invention pertains upon perusal of the following Detailed Description and drawing, wherein:

BRIEF DESCRIPTION OF THE SEVERAL VIEWS OF THE DRAWINGS

FIG. 5 Shows a user interface for defining a target standby database and other Fast-Start Failover parameters;

FIG. 6 Shows a user interface for enabling flashback logging;

Figure 1:
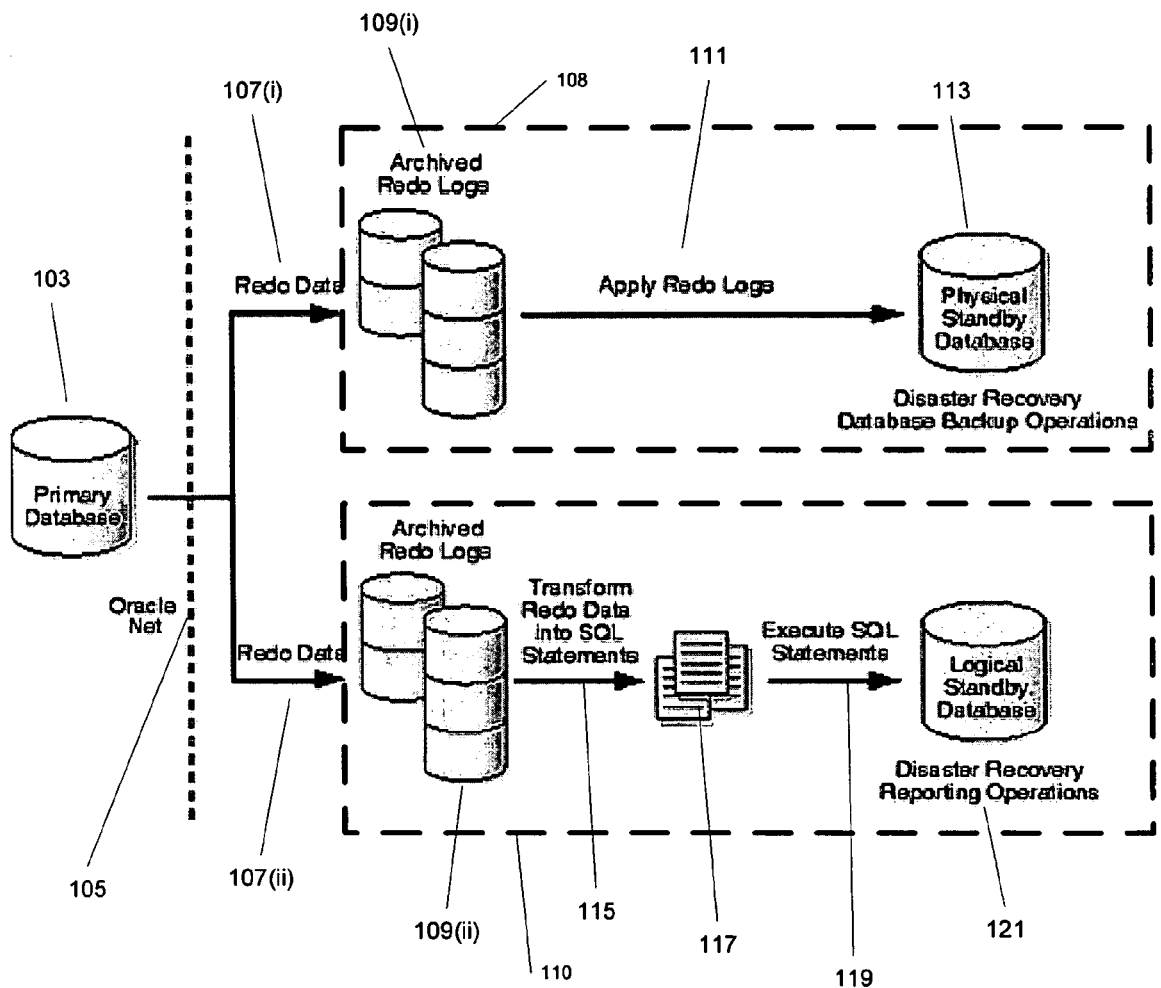
FIG. 1 Shows a database system that is replicating data to multiple standby databases across a network.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION OF THE INVENTION

The following Detailed Description discloses techniques for automating configuration and monitoring of the Fast-Start Failover (FSFO) feature of an Oracle database system. FSFO itself is an improvement to the Data Guard component of the Oracle 10g Release 2 database system. The disclosed automation techniques are employed in the Data Guard component of the Oracle 10g Release 2 database system.

Figure 2:
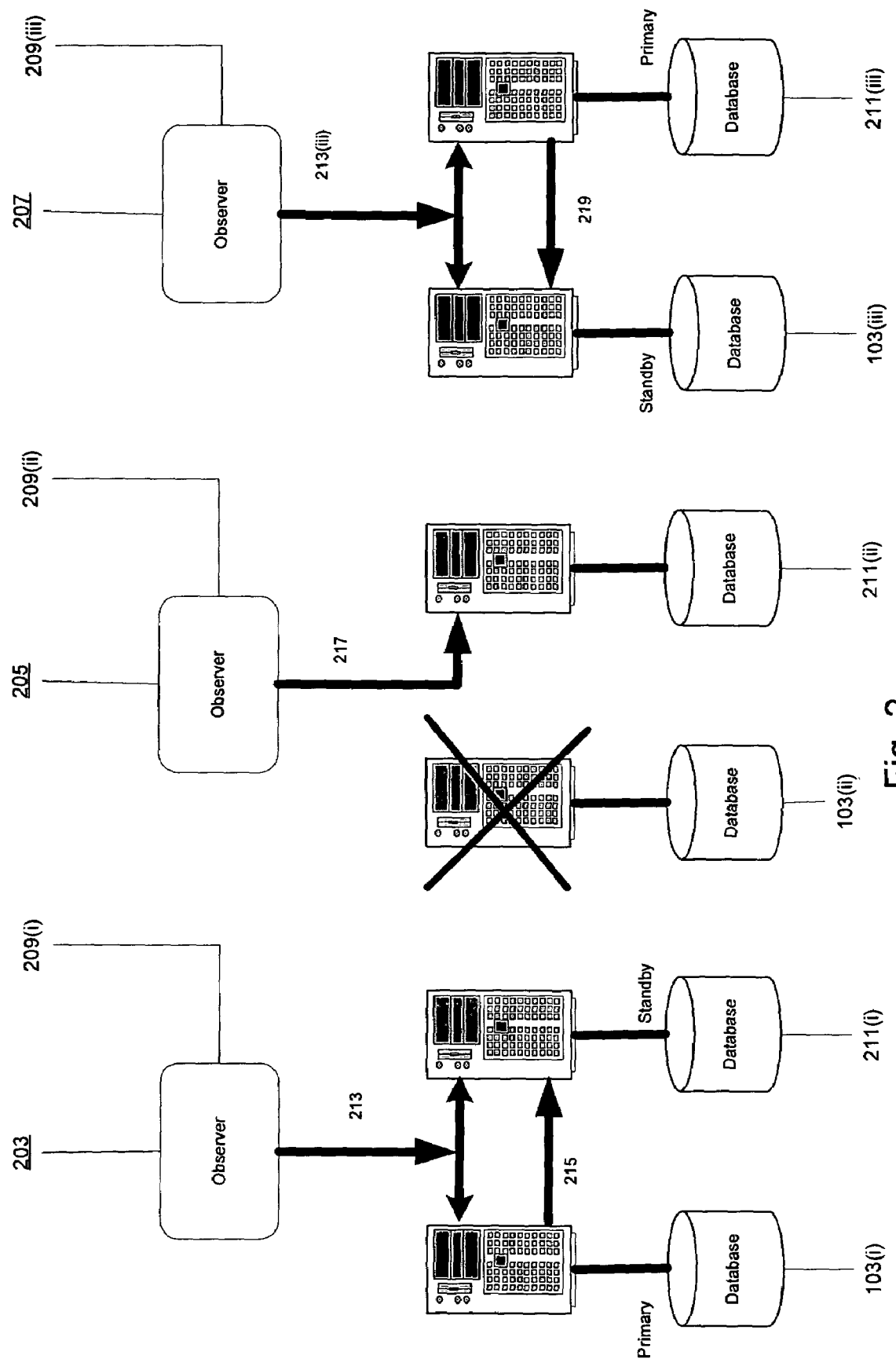
FIG. 2 Shows a failover of a replicated database.

FIG. 2 shows a presently preferred embodiment related to the invention failing over from a primary database to a standby database. A normally functioning replicated database system is shown at 203. The replicated database system 203 has a primary database 103 and standby database 211. Additionally, an independently executing and typically remote observer process 209 is in contact with and monitoring both databases 103 and database 211, as shown by arrow 213. Note that observer process 209 may be embodied as a separately executable process on its host machine, or as a thread of execution, if that is more appropriate for its host machine. The only requirement is that the observer be an independently executing entity that is capable of connecting to the databases 103 and 211 over the network 105. Whether it is embodied as a process, a thread, or other separately executing entity, observer 209 will be referred to herein as the 'Observer process' or just 'Observer'.

When the replicated database system is functioning as shown at 203, primary database 103 is forwarding redo-data 107 to redo log files 109 and the redo-data is being applied to standby database 211 (arrow 215). During normal functioning of the replicated database as shown at 203, primary database 103 fails. At 205 is shown how the replicated system fails over from failed primary database 103 to standby or failover target database 211. Because database 103 has failed such that Observer 209 no longer is in communication with database 103, Observer 209 is in communication only with database 211, as shown by arrow 217 and database 103 has ceased sending database 211 redo-data. Observer 209 automatically initiates a failover such that standby database 211 becomes the new primary database 211. Upon failover, applications that would be attached to failed primary database 103 are re-attached to the new primary database 211 instead. Modifications to the new primary database 211 are stored in redo log files in the usual fashion. At 207 is shown what happens when Observer 209 notes that database 103 has become available again. Observer 209 now has communication with both database systems, as shown by arrow 213(iii). Working together, new primary server 211 and Observer 209 recover failed primary 103 such that it may serve the new primary as its standby server. At this point, database 211 is the primary database and database 103 the standby database. Redo-data 221 flows from database 211 to database 103, as shown by arrow 219. This arrangement may continue indefinitely, or it may continue only until database 103 is synchronized with database 211, at which point database 103 may again become the primary database system and database system 211 again the standby.

Fast-Start Failover System

Figure 3:
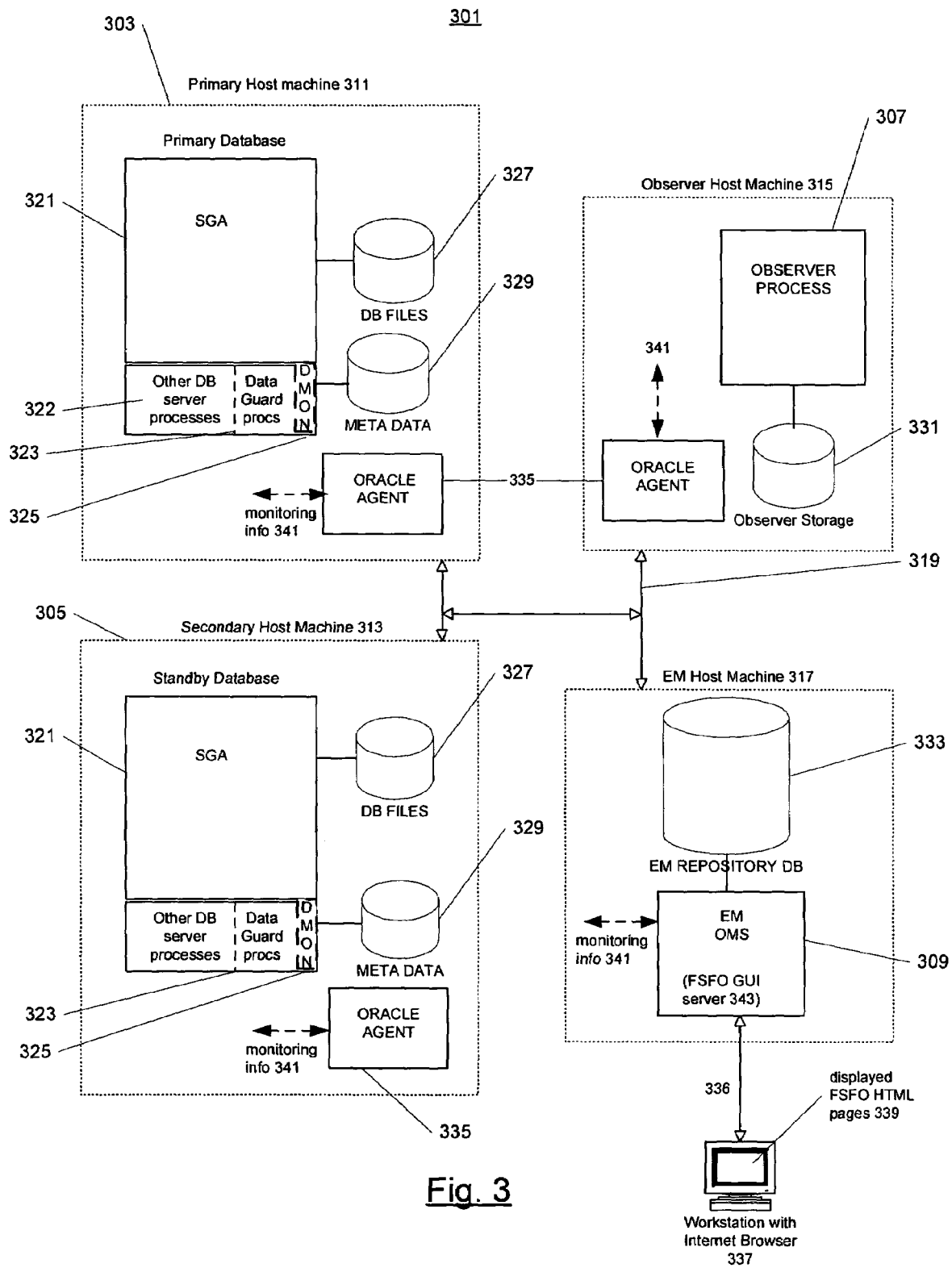
FIG. 3 Shows the components of a system which may be configured for automatic failover.

FIG. 3 shows the relationship between the components of a database system configured for automatic failover. Fast-Start Failover system 301 includes a primary database system 303, any number of standby database systems 305, Observer process 307, and an Oracle Management Service (OMS) 309, part of Oracle Enterprise Manager (EM). Oracle Enterprise Manager (EM) is a Web-based setup, management, and monitoring framework for Oracle enterprise database system environments, comprising multiple components including OMS 309, repository database 333, and Oracle Agents 335. Each of the components of system 301 preferably runs on its own host machine 311-317. Host machines 311 and 313 are termed in the following database servers. The components are networked together by network 319.

Each host 311 and 313 contains a primary database system 303 or standby database system 305. These database systems are termed in the following instances of an Oracle database system. The components of the database system include System Global Area (SGA) 321 which is used to share data between processes. Among the processes belonging to an Oracle database instance are database processes 322, including processes devoted to carrying out the Data Guard functionality 323 of the Oracle database. Chief among these with respect to the present invention is Data Guard Monitor process (DMON) 325. DMON 325 maintains a separate persistent store of configuration metadata 329. Metadata 329 stores a profile of the Data Guard configuration, that is, information as to which database system is primary, which database system is standby, whether or not automatic failover is enabled, the value of the FSFO Threshold, and other configuration data. A portion of this profile concerns Fast-Start Failover and is termed in the following the FSFO context.

DMON process 325 of each database instance 303 or 305 communicates with the DMONs 325 of all the other instances in the Data Guard configuration. These collectively manage and monitor all of the instances of the configuration as a single cohesive unit from the perspective of users of the database instances. DMONs 325 working together in this fashion are collectively referred to as "the Data Guard Broker".

Each DMON 325 has its own copy of configuration metadata 329. There is a master copy that is maintained by DMON 325 of primary instance 303. DMON 325 provides a copy of that file to each standby instance's 305 DMON 325, hence all instances 303-305 in the configuration 301 have access to the same information in metadata store 329.

It is recommended that Observer process 307 be placed on a separate host 315 from other hosts 311, 313, and 317 in the configuration 301. Observer process 307 maintains a small amount of persistent storage 331, into which it records relevant information pertaining to the Data Guard configuration that it will be 'observing'.

EM host machine 317 contains Oracle Management Service (OMS) 309 which interfaces with the Data Guard Broker's DMON processes 325. The EM OMS 309 maintains an EM repository database 333 into which is recorded information that is needed by EM to manage the FSFO configuration, including information about all of the databases that it has discovered. Oracle Agent 335 on the respective host machines communicate with the primary and standby database's DMONs and EM OMS 309, as indicated by arrows 341. EM OMS 309 works with Oracle Agent 335, a component that resides on primary server 303, standby servers 305, and Observer Host machine 315. Agent 335 allows the EM OMS to manage and monitor remote systems, and perform remote operations on those remote systems. The combination of the Data Guard Broker infrastructure (DMONs 325), EM OMS 309, and Oracle Agents 335 allow the automation of configuring, maintaining and monitoring the database servers and Observer 307. The Observer Host 315 and EM machines 317 are also connected to network 319 to which primary 311 and standby database 313 servers are connected.

In conjunction with an HTTP server that is part of EM, EM OMS 309 also functions as the server for the FSFO graphical user interface (GUI), which is the graphical user interface that is used to configure FSFO. This function is indicated by the legend "FSFO GUI server 343". The graphical user interface utilizes the Internet http protocol. EM OMS 309 and the HTTP server provide the graphical user interface in the form of HTML pages to Web client 337, which is a workstation with a standard Web browser. Web client 337 is connected to the HTTP server via network 336, which may be a component of network 319. EM OMS 309 has a connection via network 319 to one of the machines which host a primary or standby database. In response to inputs from the user of browser 337, FSFO HTML pages made by EM OMS 309 and the HTTP server from information obtained from DMON process 325 are displayed on client 337. The user of client 337 inputs the configuration information to fields of the displayed HTML pages 339.

In overview, configuration using browser 337 works as follows:

1. The user of browser 337 requests an HTML page belonging to the configuration graphical user interface.

2. EM OMS 309 and the HTTP server construct the HTML page using current FSFO information obtained from DMON process 325 and provides the HTML page to browser 337
3. The user enters values in fields of the HTML page and selects another page.
4. The entered values are retained by EM OMS 309.
5. The above process of making an HTML page, sending it, receiving values from the user, retaining the values, and sending another continues until the user indicates that the configuration process is finished.
6. At that point, EM 309 propagates the updated FSFO information to metadata 329 in servers 303 and 305, where it is persistently stored.

When the Observer Starts Up:

Oracle Agent 335 located on Observer Host 315 starts Observer 307 and gives it a network connect string that allows Observer 307 to connect to the primary database server 303. The connect string was provided to Oracle Agent 335 by EM OMS 309 which has this information stored in EM repository database 333.

Observer 307 uses this connect string to connect to primary database server 303. Observer 307 registers itself with primary server 303's DMON 325, passing information about itself to the server. Note that until this occurs, primary database server 303 has no information about, and is unaware of, Observer 307.

Registration also includes an authentication step. If Observer 307 is authenticated, its registration information (location of Observer Host 315, etc.) is recorded by primary's 303 DMON process 325 in DG metadata file 329, and a positive acknowledgement is passed back to Observer 307. The acknowledgement includes an observer identifier that identifies the current Observer. Each time an Observer is deregistered and a new Observer registered, the observer identifier is incremented.

Observer 307 then queries primary database server 303 for FSFO context information by executing a "GET_FSFO" command. Upon receipt of this command, primary database server 303 will pass back to Observer 307 information from DG metadata 329 including:

Whether or not FSFO is enabled at the moment.
Which instance is the primary database system and how to reach it
If FSFO is enabled, then additionally
Which standby instance 305 is the FSFO target standby database system and how to reach it
The current value of the FSFO Threshold
The Metadata Incarnation Value (MIV), which is a monotonically increasing number that is incremented for every change that is ever made to the DG metadata 329
Other FSFO related information
Observer 307 stores this information in its local "Observer Storage" file 331.

If FSFO has not been enabled, Observer 307 will periodically reattempt the gathering of FSFO information from primary database server 303 and will not actually be "observing" until it receives an indication from the primary database server 303 that FSFO has now been enabled.

Observing—Steady State

Once these initial steps have occurred and FSFO has been enabled by EM at primary database server 303, Observer 307 begins "observing". This consists of periodic pings to primary database server 303 and FSFO target standby server 305, specifically to the Broker's DMON processes 325 in the primary database server 303 and standby database server 305.

Each ping consists of a message sent by Observer 307 to the database server that includes the following:
The Observer ID that Observer 307 received from server 303 upon successful registration;
the Observer's current MIV; and
the current role, either primary or standby, of the server being pinged.

The current MIV and the current roles were received from server 303 in response to the Observer's most recent "GET_FSFO" command.

From Observer 307's point of view, the Observer's pinging accomplishes the following purposes:
If the server being pinged fails to respond, the server may be down or connectivity with the Observer may be lost; in the case of primary database server 303, that means that a failover condition may have arisen.
If the server does respond, the response may indicate
that there are no problems;
that the Observer does not have the current FSFO context;
in the case of primary database server 303, that a failover condition has arisen; or
if the current Observer ID on the server is not equal to the Observer's observer ID, that the Observer has been deregistered and is no longer the current Observer. In this case, the Observer process terminates itself.

From the point of view of servers 303 and 305, the pinging confirms the current role of the server and confirms that Observer 307 is the current observer, is running, and that there is connectivity between the Observer and the server.

The function that responds to the ping in server 303 or 305 revalidates the authentication code to ensure that this is the one and only Observer that had successfully registered itself with the server. The function then compares the MIV that was supplied by Observer 307 to the current MIV maintained by the server. If the MIV supplied by the Observer is equal to the MIV that is current on the server, the Observer has the current FSFO context. If that is not the case, the server indicates to the Observer that the Observer does not have the current FSFO context and the Observer fetches the current FSFO context from the server. To do this, Observer 307 issues the "GET_FSFO" command to the server in order to refresh the Observer's FSFO context, including a new MIV. The FSFO context is stored in Observer Storage 331, and Observer 307 resumes steady-state pinging. The mechanism for detecting whether Observer 307 has the current FSFO context is also how Observer 307 becomes aware of changes to FSFO context resulting from user inputs at browser 337 that are made while Observer 307 is running.

Primary server 303 then performs a number of internal checks to determine if there is a problem with the server's database that would warrant an immediate failover. It also checks for any conditions that would specifically prevent an automatic failover, such as the knowledge that primary 303 and standby 305 are not currently synchronized in terms of the redo-data that is currently available to each. After doing all of these internal checks, a primary server 303 sends a response back to Observer 307. The server 303 finishes by taking note of when the ping occurred so that a record exists that Observer 307 appears to be alive. If the response indicates that an immediate failover is necessary, Observer 307 automatically initiates the failover if that is possible.

The recording of most recent pings from Observer 307 by primary server 303 and standby server 305 collectively serve to reassure the database servers that the Observer is alive and well. Should some calamity occur to the Observer such that the age of most recently recorded pings becomes excessive, primary server 303 makes a warning message indicating an unobserved condition concerning Observer 307 available to EM OMS 309, which may then take steps to restart failed Observer 307. Such restarts in response to unobserved conditions will be discussed in detail later.

FSFO Property Changes and Their Effect on the Observer

While FSFO is enabled, it is possible to change any FSFO-related property from the EM OMS 309, via browser 337. GUI-driven changes—such as an adjustment of the FSFO Threshold—are automatically picked up on running Observer 307 via the mechanism described in the previous section. Some GUI-driven changes, such as a change of the FSFO target standby database 305, require that FSFO be disabled and re-enabled. However, EM makes all changes transparent from the user's standpoint, in that the "right thing" happens under any circumstance. If FSFO must be disabled and re-enabled as part of a configuration change, EM OMS 309 does it automatically when it applies the changes received from the user at browser 337.

It is also possible from the GUI to start and stop a running Observer 307, or move the Observer from its current host 315 to a different host. EM OMS 309 accomplishes an Observer 307 move by communicating to the primary server's 303 DMON process 325 that it should convey to existing Observer 307 that its registration has been revoked and that it should shut itself down. This act of de-registering the existing Observer completes immediately. The existing Observer 307 will learn from the primary server 303 as of its next ping that its registration has been revoked, and will then shut itself down. Thus there is no need for EM OMS 309 to await the occurrence of the next ping and the actual Observer shutdown. EM OMS 309 immediately runs a remote operation via Oracle Agent 335 on the new host to start a new Observer process 307. Again, this is a transparent operation from the user's perspective. Any FSFO-related property can be changed from EM from the same GUI used to perform the initial FSFO setup.

Automatic Restart of the Observer in Response to an Unobserved Condition

As already pointed out, a combination of EM OMS 309, Oracle Agent 335 on primary host 311, and primary database DMON process 325 is used to implement a framework that continuously monitors the status of the FSFO configuration. The Oracle Agent on the primary host connects to the primary database DMON process at regularly scheduled intervals, obtains current status information for the FSFO configuration, and forwards this information to the EM OMS. If the status information indicates that the FSFO configuration is unobserved—which may mean the Observer is no longer running or the Observer machine has been rebooted—the EM OMS raises a user-visible alert on a web page provided by EM for monitoring general status of the primary database. If the user specified the optional Observer restart capability when configuring FSFO (via check-box 515 in the Data Guard Fast-Start Failover GUI, FIG. 5), the EM OMS will automatically dispatch a remote job to Oracle Agent 335 on Observer host 315 to restart the Observer process in an attempt to clear the unobserved condition in the FSFO configuration. If the Observer restart attempt is successful, the EM OMS initiates an immediate reacquisition of the current FSFO status information via the Oracle Agent and primary database DMON process. The current FSFO status information will indicate the unobserved condition is no longer present, and the status displayed by EM for primary database 303 will be updated to reflect normal FSFO operation.

Observer Detects Need for Failover

There are two basic ways for Observer 307 to decide that a failover should be attempted. The first has already been described. The function on the primary server 303 that responds to the ping will perform certain internal checks to determine if any conditions exist that would require a failover. In a preferred embodiment, one such condition is datafile corruption. In other embodiments, there may be other conditions that require a failover. Conditions in primary database 303 which require a failover are termed in the following failover conditions. The existence of a failover condition is passed back to Observer 307, which immediately begins the failover sequence.

Another failover condition is lack of a timely response to a ping of primary server 303. If the ping that Observer 307 sends to the server does not receive a timely response, Observer 307 will retry the ping according to a retry algorithm that factors in the value of the FSFO Threshold. If no contact with the primary can be made before that threshold expires, Observer 307 assumes that primary database 303 has failed and begins the failover sequence.

Note, Observer 307 doesn't actually perform the failover operation. Only standby database 305 can do that with assistance from Observer 307 for certain components of the failover operation that can only be done by a client. Observer 307 will ask standby server 305 if it is "ready to failover". Standby database 305 evaluates the request and responds to Observer 307. It may respond "No" because, unlike Observer 307, it's possible that standby database 305 is actually being contacted by Primary database 303 on a timely basis. This would be the case where network connectivity between Primary 303 and Observer 307 is down, but is up between Primary 303 and Standby 305.

After evaluating the relevant conditions, Standby 305 either rejects the request or acknowledges that it can do the failover. If Standby 305 rejects the request, Observer 307 continually retries until either the conditions provoking the failover attempt get resolved, for example, connectivity between Primary 303 and Observer 307 being restored, or when Standby 305 eventually acknowledges that it can do the failover, in which case Observer 307 then tells Standby 305 to proceed with the failover.

Observer 307 records in its persistent storage 313 that a failover has begun. Observer 307 awaits status from Standby 305 that the failover operation has indeed completed, i.e., Standby 305 has now become Primary 305, and that the Data Guard metadata 329 has been updated accordingly and the MIV incremented. At this point Observer 307 begins pinging the new Primary 305 which, as described above, will respond to the Observer that the Observer no longer has a current MIV. Observer 307 then issues the "GET_FSFO" command to new Primary server 305 to refresh its copy of the FSFO context information.

Recovering the Failed Primary

Following the failover, Observer 307 continually pings the old Primary 303. Once connectivity is reestablished between old Primary 303 and both Observer 307 and Standby 305 (either by restarting a failed Primary 303 after it crashes or resolution of a network outage that led to the failover), the old Primary 303 learns from the role value in Observer 307's ping that the old Primary is no longer the FSFO primary database and indicates to Observer 307 that it is ready to become the new FSFO target standby.

Observer 307 will then send a "REINSTATE" command to new Primary 305 to begin the process of recovering the old Primary 303 to the point where it can serve as a standby to the new primary. In response to the "REINSTATE" command, old Primary 303 uses the Oracle flashback feature to roll its redo-data back to the point in time at which the failover took place. From that point, database 303 initiates operation as a standby database for new Primary 305. This completes the full FSFO cycle, in that the FSFO configuration is now enabled for failover in the opposite direction from which it was originally configured, and the new configuration is automatically and seamlessly recognized by Observer 307 and EM OMS 309.

Configuring a Fast-Start Failover System

A Database Administrator or other suitably privileged user can configure and enable Fast-Start Failover from a Web browser that is connected via the network to EM OMS 309, which in turn is connected to any database 303 or 305 in the Fast-Start Failover system 301. Enabling Fast-Start Failover does not trigger a failover. Instead, it allows Observer process 209 to begin observing primary database 103 and standby database 211 and automatically initiate a failover should a failover condition arise for the primary database.

Figure 8:
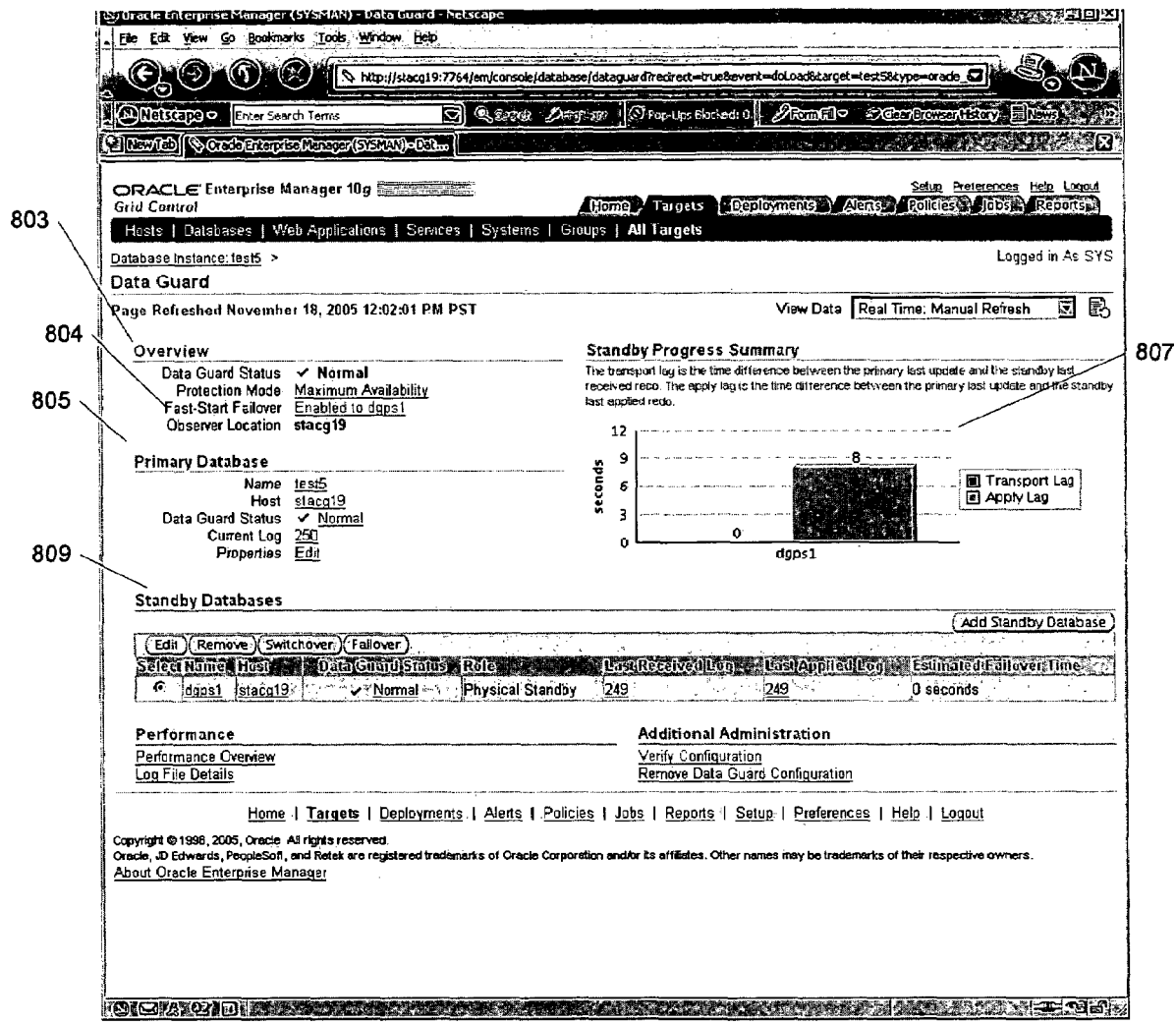
FIG. 8 Shows the state of primary and standby databases, and the Fast-Start Failover mode (enabled or disabled)

Fast-Start Failover is configured for a given Data Guard configuration. When configuring Data Guard, a user can specify a primary database and a set of up to 9 standby databases. The Oracle Enterprise Manager Data Guard Fast-Start Failover GUI configures a preexisting Data Guard configuration for Fast-Start Failover. FIG. 8 shows a page 801 that displays the current status of a Data Guard configuration that has been selected by the user. Included in the current status of the Data Guard configuration is its Fast-Start Failover Status, shown at 804 in FIG. 8. In FIG. 8, FSFO is enabled, as indicated by status field 804. Field 804 also specifies the current FSFO standby database system. When FSFO is not enabled, FSFO field 804 contains a "Disabled" link. The database administrator clicks the "Disabled" link to invoke the FSFO GUI. This action will cause the configuration web page of FIG. 5 to appear.

Figure 5:
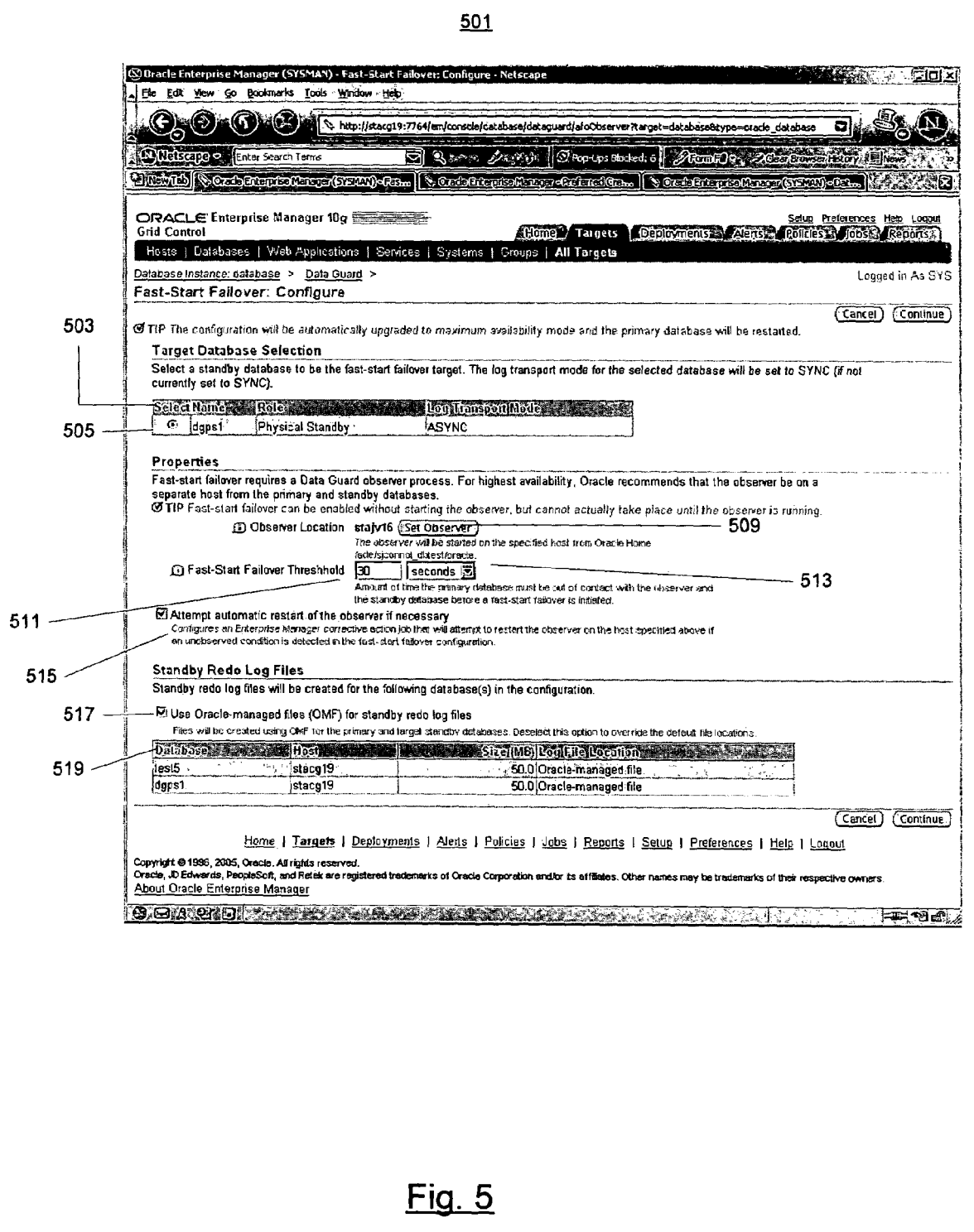

FIG. 5 shows a Fast-Start Failover configuration page 501. Page 501 contains a number of data entry fields. The first is Target Database Selection 503, a table that contains rows of databases available for configuration as the FSFO target, i.e., standby databases. The columns of the table are Select, Name, Role, and Log Transport Mode. At 503, database dgps1 is selected in the "select" column and is therefore the prospective or current FSFO target. (There can be up to nine candidate target standby databases in the table, only one of which can be specified as the FSFO target.) The name of the selected database is dgps1. The role of the database is physical standby and the current Log Transport Mode for forwarding redo-data to the database is ASYNC (which will be automatically changed to SYNC by EM during the setup procedure). A FSFO Threshold duration of time representing the amount of time the primary 103 may be safely out of contact with the Observer 209 and the standby 211 is input at 511. The duration of time is further defined by a unit of time 513. A check-box input 515 indicates whether the Observer 209 should automatically be restarted if the Observer process is found to not be running on its host machine. Standby Redo Log Files section 517 provides options for creation of standby redo files that must exist in a standby database system. Because a primary may end up as a standby after a failover, both the primary 103 and standby 211 must have standby redo files. EM automatically calculates the correct complement of standby redo log files—including sizes and number—and displays the result in table 519. The table shows the database name and host where the files will be created, the size of the files and the location of the files. The location may be user configurable, or may be managed automatically by the Oracle-managed files feature of the Oracle database. (The example in FIG. 5 shows the latter case.)

Figure 4:
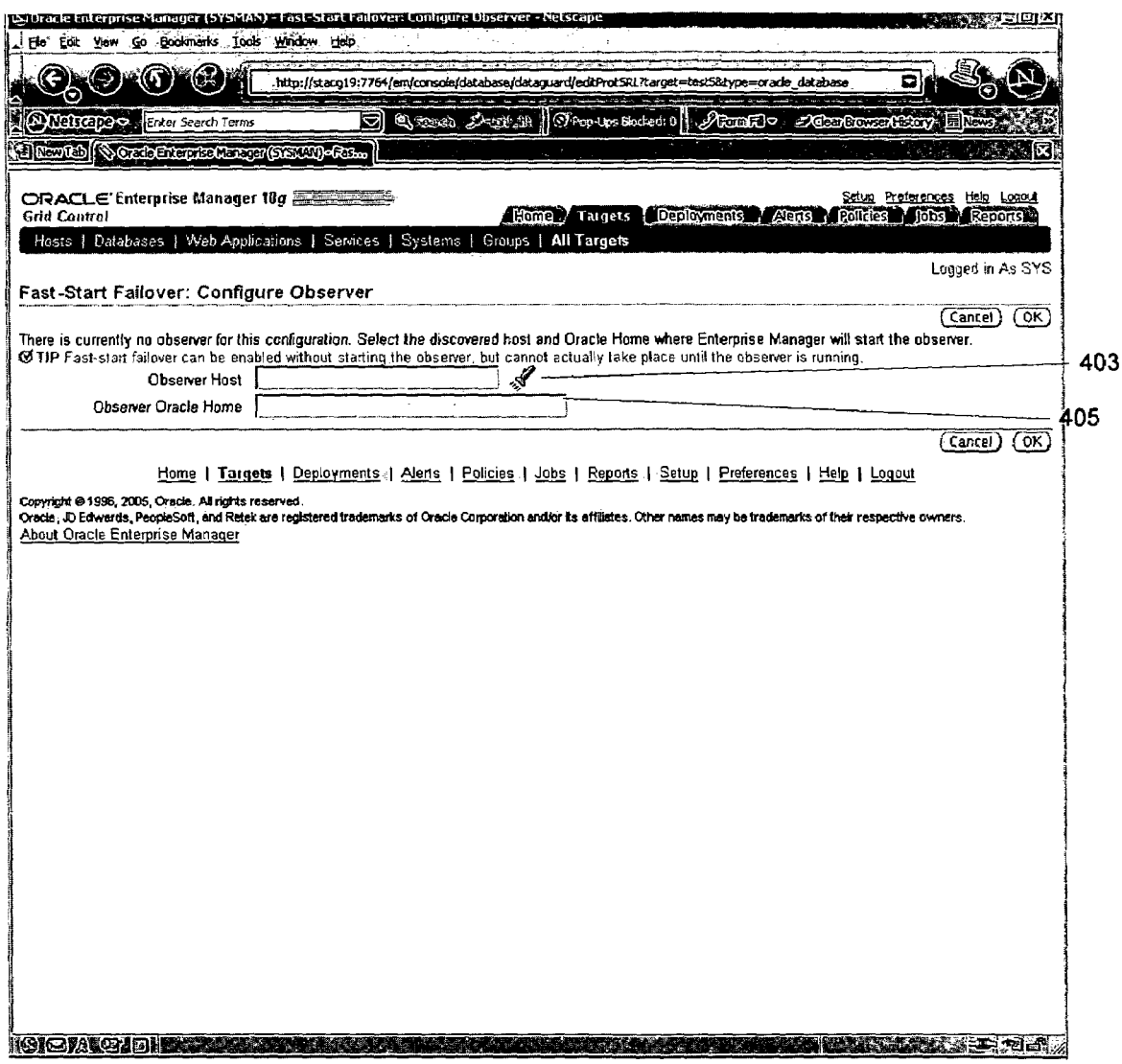
FIG. 4 Shows a user interface for defining an Observer.

To specify the location of the Observer process, the user clicks the Set Observer button 509 to request a page to configure the Observer process. FIG. 4 shows a page for the configuration of the Observer 209. Field 403 allows specification of the host machine upon which the Observer process will be run. Field 405 allows the administrator to input the file system location of the Oracle home directory from which the Observer will be invoked. If an Observer has already registered with the primary server 303, fields 403 and 405 contain the names of the existing Observer's host and Oracle home directory.

Figure 6:
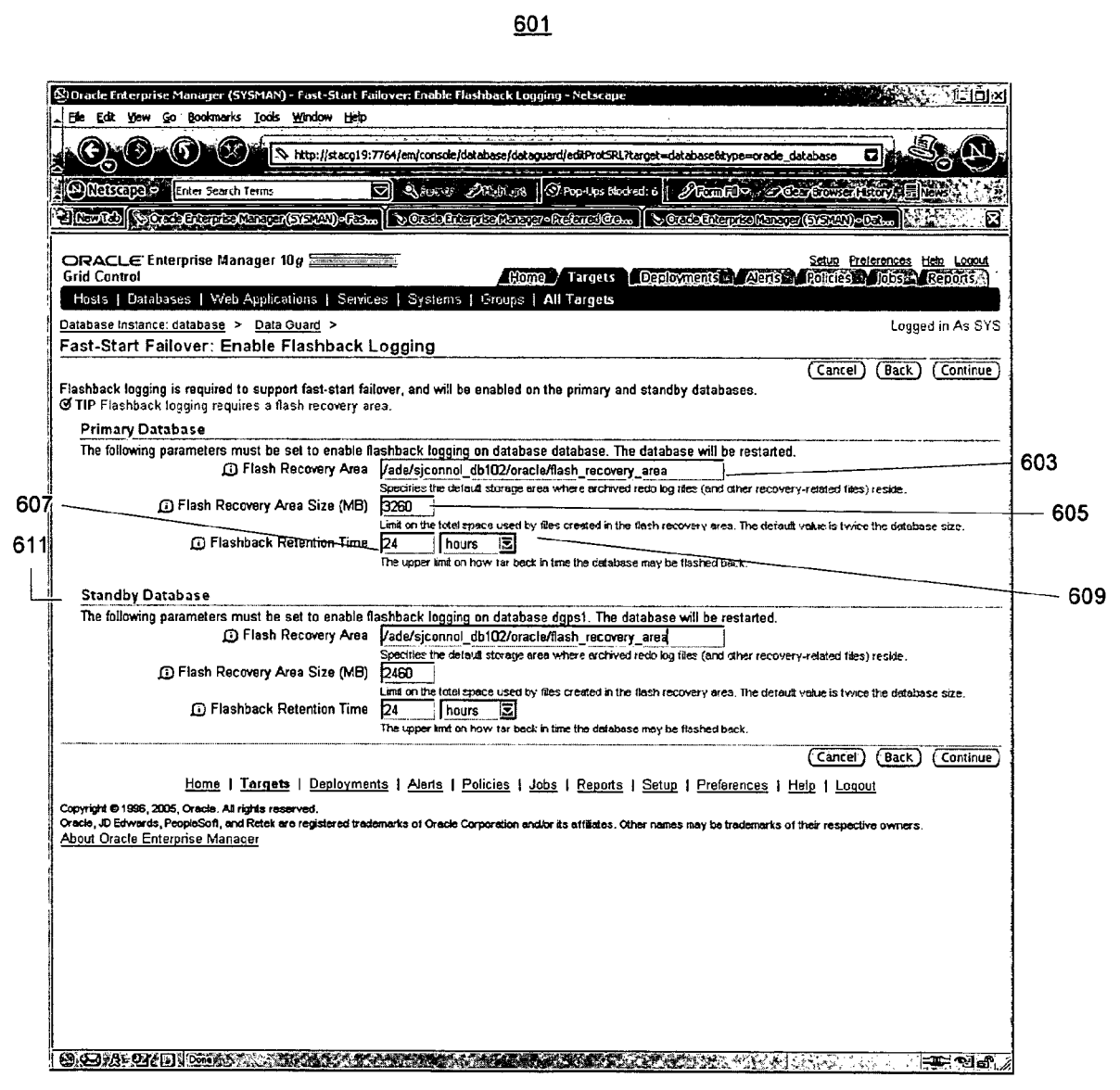

FIG. 6 shows a user interface for enabling flashback logging. Flashback is a utility provided by Oracle for reading the history of information in the database system from the redo-data, and is required to enable FSFO. Specifically, flashback logging is a technique that is used to help recover a failed primary database after a failover has occurred such that the failed primary may become a fully functional standby database serving to protect the new primary database. A filesystem directory for a flashback recovery area is shown in input field 603. Input field 605 allows the administrator to enter the size of the Flash Recovery Area in mega-bytes. Field 607 allows the administrator to enter the length of time that flashback data will be retained and field 609 defines the unit of time. A further page will be displayed to ask the administrator if the configuration should proceed.

Figure 9:
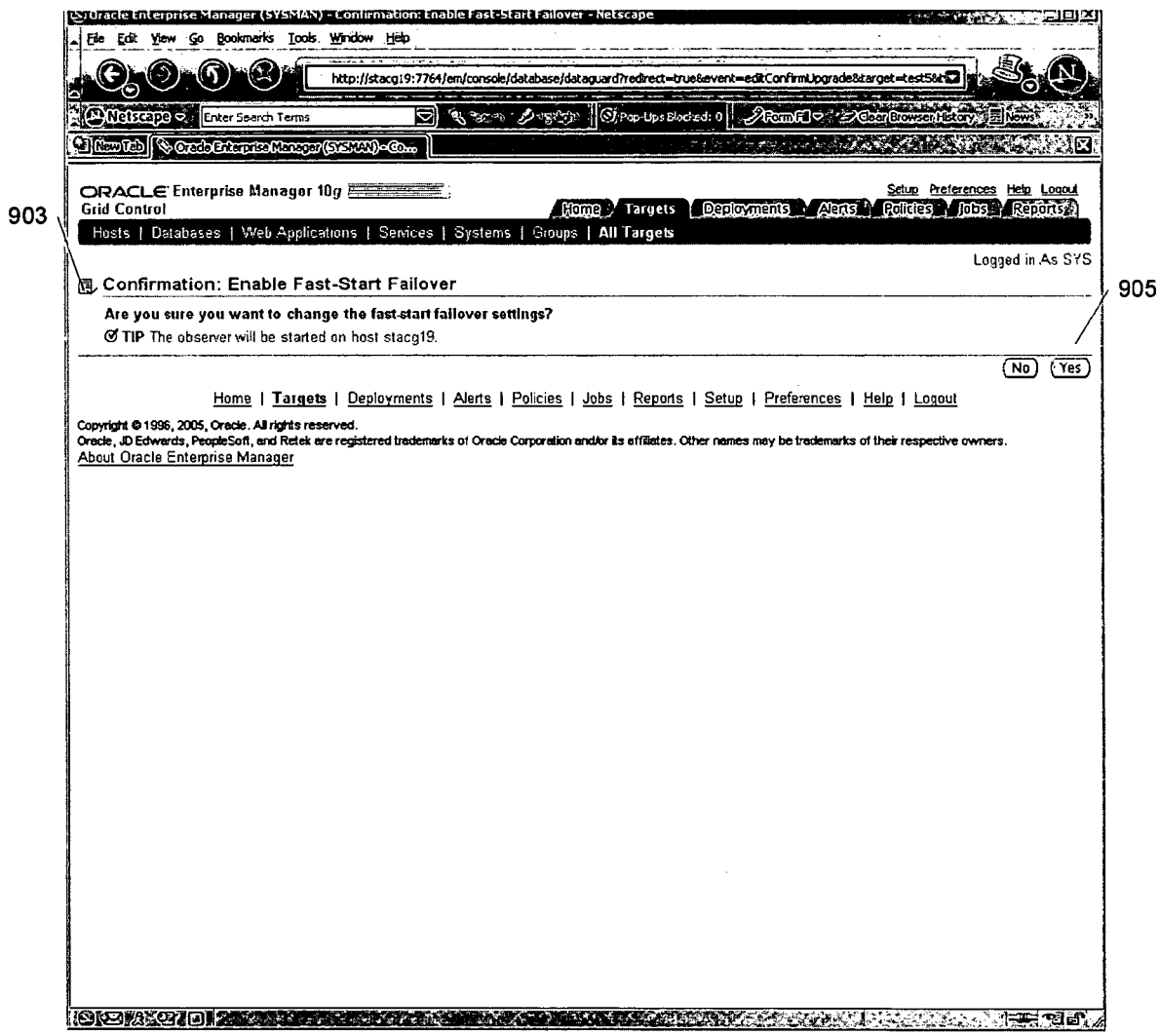
FIG. 9 Shows a user interface for confirming that Fast-Start Failover configuration changes made using the GUI should be applied.

FIG. 9 is the HTML page that the user employs to indicate that he or she is finished configuring Fast-Start Failover and wishes to enable Fast-Start Failover with the changes. Page 901 contains panels and buttons. The panel 903 asks if you want to enable Fast-Start Failover with the new configuration. Buttons 905 can input a "yes" or "no" to the question.

Figure 7:
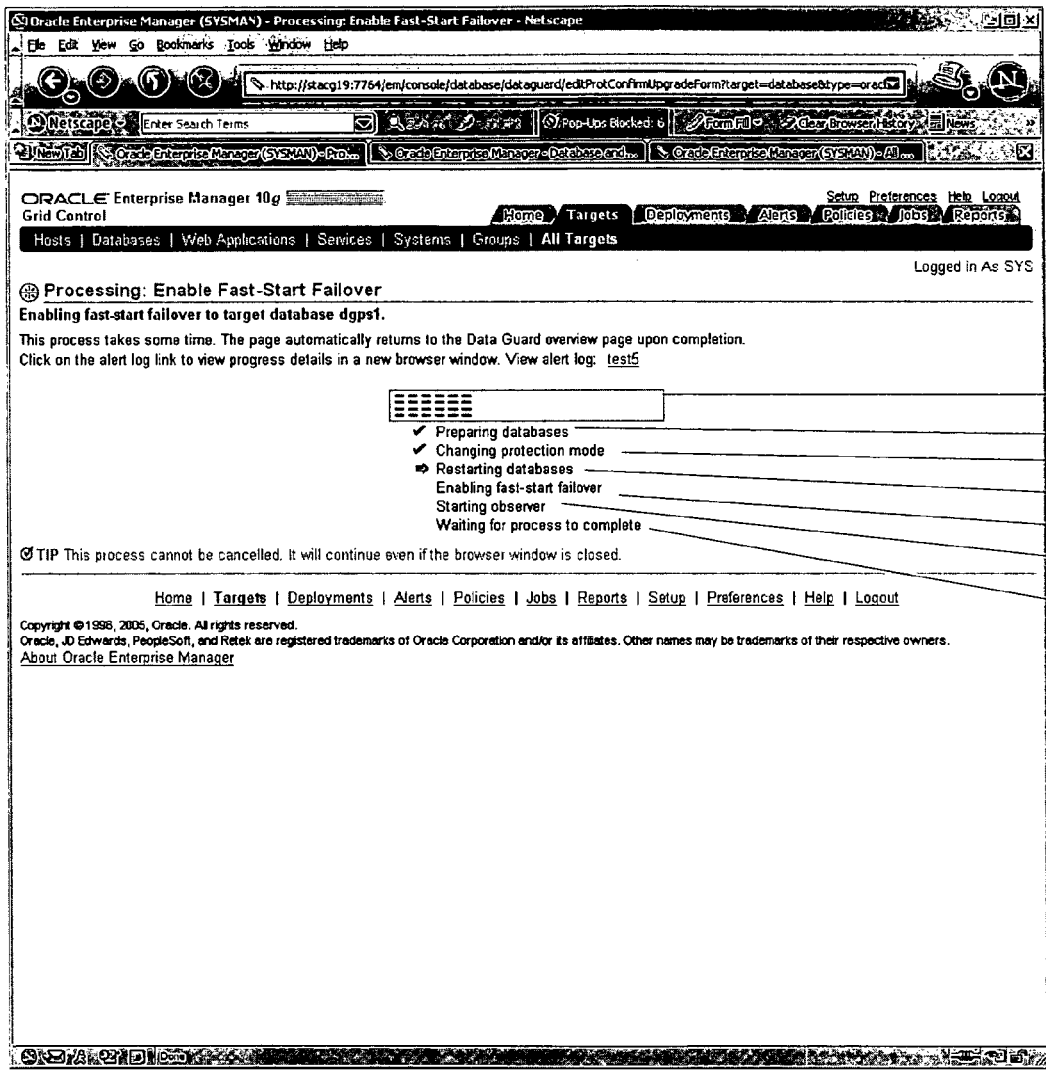
FIG. 7 Shows a progression of the setup of a standby database for Fast-Start Failover.

When the user pushes the "yes" button in page 901, EM OMS 309 responds with page 701 in FIG. 7. Page 701 shows how the automated setup of a Fast-Start Failover configuration is progressing. Status bar 703 displays the forward progress of the automated setup. Status fields 705-715 use check mark icons to indicate those portions of the set up which have been completed and an arrow to indicate the portion of the set up which is currently being done. The remaining portions have not been completed. Thus, at this point, standby redo log files have been created on the primary and standby databases (705) and the protection mode of the databases has been upgraded to maximum availability, which is the protection mode that is required for automatic failover to be enabled (707). Currently, the primary and standby databases are being restarted with their new configuration (709). The remaining portions of the set up have not yet been completed. They are enabling Fast Start Failover (711), starting the Observer process (713), and completion of the setup (715).

Once Fast-Start Failover has been successfully configured, Observer 209 continuously monitors the configuration to ensure that the primary database is available. If Observer 209 infers that a problem exists due to the lack of a response from the primary database, Observer 209 attempts to reconnect to the primary database within the time specified by the FSFO Threshold. If the problem is not remedied within the specified time or the primary database has conveyed directly to the Observer that a failover condition exists, and the target standby database is ready for failover, the Observer immediately invokes a failover at the standby database. Because a Fast-Start Failover is automatic and fast, an administrator may not be aware it has happened until the administrator notices that post-failover recovery at the failed primary database is needed or is already occurring.

The current state of the Data Guard configuration, including the FSFO target database, is shown in FIG. 8. The Enterprise Manager Data Guard overview page 801 has a section 803 that includes the Data Guard Status. Panel 803 further indicates the protection mode of the Data Guard configuration, the Fast-Start Failover mode (Enabled or Disabled), the name of the Fast-Start Failover target standby database, and the location of the Observer process. Panel 805 contains information about the primary database, including the database name, the host that it is running on, its status, the current log, and a field to allow editing of the database properties. Panel 807 graphically and numerically shows the lag between the application of redo-data to the primary and the standby database. Panel 809 shows the standby database, its name, Data Guard status, role in the Fast-Start Failover configuration, the number of redo log files received by the database, the number of redo log files applied to the database, and the amount of time required to execute an actual failover to the standby database. The Data Guard overview page 801 graphically shows whether a database is ready for failover. As long as redo-data from the primary database still needs to be received by the standby database, the failover operation cannot be performed automatically

CONCLUSION

The foregoing Detailed Description has disclosed to those skilled in the relevant technologies how to make and use the techniques of the invention for configuring automatic failover and has further disclosed the best modes presently known to the inventors of so doing. It will be immediately apparent that many variations on the techniques disclosed herein are possible. A graphical user interface like the one disclosed herein may be used with any database backup and recovery system that replicates data across a number of servers and uses a third party (observer) as a broker of the indication of the state of the entire system. The graphical user interface may have any form which permits the user to input the necessary configuration information and will generally have a form which conforms to the conventions for graphical user interfaces that are used in the system the interface is being used with. The information that is necessary to configure automatic failover will also depend on the kind of system that is being configured. Further, many different arrangements may be made to provide the observer with the information obtained via the configuration GUI and interactions between the observer and the standby database system may be different from the ones disclosed herein. For all of the foregoing reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

The invention claimed is:

1. A method of configuring automatic failover from a primary database system to a standby database system, the primary database system and the standby database system being coupled together by a network and the method comprising the steps of:
   in a graphical user interface server that is coupled to the network, providing a graphical user interface to a graphical user interface client that is coupled to the network, the graphical user interface client receiving an input of automatic failover configuration information by a user of the graphical user interface client, and the graphical user interface server receiving the automatic failover configuration information from the graphical user interface client and storing the automatic failover configuration information in persistent storage accessible via the network; and
   in an observer that is coupled to the network and executes independently of the primary database system and the standby database system, obtaining the automatic failover configuration information from the persistent storage,
the observer initiating the automatic failover from the primary database system to the standby database system in accordance with the automatic failover configuration information.

2. The method set forth in claim 1 wherein:
   the graphical user interface server has access to automatic failover status information; and
   in the step of providing the graphical user interface, the graphical user interface server includes automatic failover status information in the graphical user interface.

3. The method set forth in claim 1 further comprising the step of:
   when the automatic failover configuration information so indicates, enabling the observer to initiate automatic failover in accordance with the automatic failover configuration information.

4. The method set forth in claim 1 further comprising the step of:
   in the observer, detecting whether an automatic failover is required by pinging the primary database system and receiving an indication in response thereto that the automatic failover is required.

5. The method set forth in claim 1 wherein the automatic failover configuration information comprises:
   a designator for the primary database system; and
   a designator for the standby database system.

6. The method set forth in claim 5 wherein the automatic failover configuration information further comprises:
   a location for the observer.

7. The method set forth in claim 5, wherein:
   the graphical user interface provides a plurality of standby database system designators: and
   the user selects the designator for the standby database system by selecting one of the plurality of standby database system designators.

8. The method set forth in claim 5, wherein the automatic failover configuration information further comprises:
   a threshold time, the threshold time determining a minimum period of time for which the observer must be out of contact with the primary database system before the observer initiates the automatic failover.

9. The method set forth in claim 5 wherein the automatic failover configuration information further comprises
   a restart indication, the restart indication specifying that a stopped observer is to be automatically restarted and the method further comprises the steps of:
   receiving automatic failover status information in a monitor; and
   when the automatic failover status information and the restart indication so require, restarting the observer.

10. The method set forth in claim 5 wherein the automatic failover configuration information further includes observer configuration information; and
   the method further comprises the step of:
   configuring the observer as specified in the observer configuration information.

11. The method set forth in claim 1, wherein:
the observer periodically determines whether the automatic failover configuration information in the persistent storage has changed; and
when the observer so determines, the observer obtains the changed automatic failover configuration information.

12. The method set forth in claim 1 further comprising the step of:
in the graphical user interface server, restarting the observer when the received automatic failover configuration information so requires.

13. The method set forth in claim 1 further comprising the steps of:
in the graphical user interface server, creating the observer when the received automatic failover configuration information so requires.

14. The method set forth in claim 1 further comprising the steps of:
receiving automatic failover status information in a monitor; and
when the automatic failover status information so requires, restarting the observer.

15. The method set forth in claim 1, wherein:
the persistent storage belongs to the primary database system.

16. The method set forth in claim 15 wherein the step of obtaining the automatic failover configuration information comprises the steps of:
periodically determining from the primary database system whether the automatic failover configuration information has changed; and
obtaining the changed automatic failover configuration information from the primary database system.

17. The method set forth in claim 16 wherein the step of periodically determining further comprises the steps of:
transmitting to the primary database system an automatic failover configuration information version number; and
receiving an indication from the primary database system whether the transmitted version number is the current version number.

18. The method set forth in claim 15 wherein the automatic failover configuration information further comprises:
a threshold lime, the threshold time defining a minimum period of time for which the observer must be out of contact with the primary database system before the observer initiates the automatic failover,
the observer periodically pinging the primary database system to determine whether the threshold time has been exceeded.

19. A computer readable storage medium comprising program instructions for configuring automatic failover from a primary database system to a standby database system, the primary database system and the standby database system being coupled together by a network, the instructions for:
in a graphical user interface server that is coupled to the network, providing a graphical user interface to a graphical user interface client that is coupled to the network, the graphical user interface client receiving an input of automatic failover configuration information by a user of the graphical user interface client, and the graphical user interface server receiving the automatic failover configuration information from the graphical user interface client and storing the automatic failover configuration information in persistent storage accessible via the network: and
in an observer that is coupled to the network and executes independently of the primary database system and the standby database system, obtaining the automatic failover configuration information from the persistent storage,
the observer initiating the automatic failover from the primary database system to the standby database system in accordance with the automatic failover configuration information.

20. Apparatus for configuring automatic failover from a primary database system to a standby database system. the primary database system and the standby database system being coupled together by a network and
the apparatus comprising:
persistent storage accessible via the network:
a graphical user interface server that is coupled to the network, the graphical user interface server providing a graphical user interface to a graphical user interface client that is coupled to the network, the graphical user interface client receiving an input of automatic failover configuration information by a user of the graphical user interface client, and the graphical user interface server receiving the automatic failover configuration information from the graphical user interface client and storing the automatic failover configuration information in the persistent storage; and
an observer that is coupled to the network arid executes independently of the primary database system and the standby database system and that obtains the automatic failover configuration information from the persistent storage, the observer initiating the automatic failover from the primary database system to the standby database system in accordance with the automatic failover configuration information.

21. The apparatus set forth in claim 20 wherein:
the graphical user interface server has access to automatic failover status information and includes automatic failover status information in the graphical user interface.

22. The apparatus set forth in claim 20 further comprising the step of:
when the automatic failover configuration information so indicates, the graphical user interface server enables the observer to initiate automatic failover in accordance with the automatic failover configuration information.

23. The apparatus set forth in claim 20 wherein:
the observer detects whether an automatic failover is required by pinging the primary database system and receiving an indication in response thereto that the automatic failover is required.

24. The apparatus set forth in claim 20, wherein the automatic failover configuration information comprises:
a designator for the primary database system; and
a designator for the standby database system.

25. The apparatus set forth in claim 24 wherein the automatic failover configuration information further comprises:
a location for the observer.

26. The apparatus set forth in claim 24, wherein:
the graphical user interface provides a plurality of standby database system designators; and
the user selects the designator for the standby database system by selecting one of the plurality of standby database system designators.

27. The apparatus set forth in claim 24, wherein the automatic failover configuration information further comprises:
a threshold time, the threshold time determining a minimum period of time for which the observer must be out of contact with the primary database system before the observer initiates the automatic failover.

28. The apparatus set forth in claim 24 wherein:
the apparatus further comprises a monitor;
the automatic failover configuration information further comprises
 a restart indication, the restart indication specifying that a stopped observer is to be automatically restarted; and
the monitor receives the restart indication and automatic failover status information and when the automatic failover status information and the restart indication so require, the monitor restarts the observer.

29. The apparatus set forth in claim 24 wherein:
the automatic failover configuration information further includes observer configuration information; and
the graphical user interface server configures the observer as specified in the observer configuration information.

30. The apparatus set forth in claim 20, wherein:
the observer periodically determines whether the automatic failover configuration information in the persistent storage has changed; and
when the observer so determines, the observer obtains the changed automatic failover configuration information.

31. The apparatus set forth in claim 20 wherein:
the graphical user interface server restarts the observer when the received automatic failover configuration information so requires.

32. The apparatus set forth in claim 20 wherein:
the graphical user interface server creates the observer when the received automatic failover configuration information so requires.

33. The apparatus set forth in claim 20 further comprising:
a monitor that receives automatic failover status information and restarts the observer when the automatic failover status information so requires.

34. The apparatus set forth in claim 20, wherein:
the persistent storage belongs to the primary database system.

35. The apparatus set forth in claim 34 wherein:
the observer obtains the automatic failover configuration information by periodically determining from the primary database system whether the automatic failover configuration information has changed and obtaining the changed automatic failover configuration information from the primary database system.

36. The apparatus set forth in claim 35 wherein:
the observer determines whether the automatic failover configuration information has changed by transmitting to the primary database system an automatic failover configuration information version number and receiving an indication from the primary database system whether the transmitted version number is a current version number.

37. The apparatus set forth in claim 34 wherein the automatic failover configuration information further comprises:
a threshold time, the threshold time defining a minimum period of time for which the observer must be out of contact with the primary database system before the observer initiates the automatic failover, the observer periodically pinging the primary database system to determine whether the threshold time has been exceeded.

* * * * *

UNITED STATES PATENT AND TRADEMARK OFFICE
CERTIFICATE OF CORRECTION

PATENT NO. : 7,549,079 B2  Page 1 of 1
APPLICATION NO. : 11/289974
DATED : June 16, 2009
INVENTOR(S) : Sean Connolly It is certified that error appears in the above-identified patent and that said Letters Patent is hereby corrected as shown below:

On sheet 8 of 9, in Figure 8, line 1, above "Fig. 8" insert -- 801 --.

On sheet 9 of 9, in Figure 9, line 1, above "Fig. 9" insert -- 901 --.

In column 1, line 11, delete "at.," and insert -- al., --, therefor.

In column 1, line 14, delete "incoporated" and insert -- incorporated --, therefor.

In column 7, line 4, after "337" insert -- . --.

In column 12, line 22-23, delete "filesystem" and insert -- file system --, therefor.

In column 13, line 25, after "automatically" insert -- . --.

In column 14, line 43, in claim 7, delete "designators:" and insert -- designators; --, therefor.

In column 15, line 43, in claim 18, delete "lime," and insert -- time, --, therefor.

In column 15, line 65, in claim 19, delete "network:" and insert -- network; --, therefor.

In column 16, line 9, in claim 20, delete "system." and insert -- system, --, therefor.

In column 16, line 13, in claim 20, delete "network:" and insert -- network; --, therefor.

In column 16, line 25, in claim 20, delete "arid" and insert -- and --, therefor.

Signed and Sealed this

Eighth Day of June, 2010

David J. Kappos
*Director of the United States Patent and Trademark Office*